UNITED STATES PATENT OFFICE.

OTTO MANASSE, OF MUNICH, ASSIGNOR TO THE FARBENFABRIKEN, VORMALS FR. BAYER & CO., OF ELBERFELD, GERMANY.

PROCESS OF MAKING PHENOL ALCOHOL.

SPECIFICATION forming part of Letters Patent No. 526,786, dated October 2, 1894.

Application filed May 31, 1894. Serial No. 513,077. (No specimens.)

*To all whom it may concern:*

Be it known that I, OTTO MANASSE, doctor of philosophy, chemist, a subject of the Emperor of Germany, residing at Munich, in the Kingdom of Bavaria, Germany, have invented a new and useful Improvement in the Manufacture of Phenol Alcohols; and I declare the following to be a full and clear description of my invention.

My invention relates to the production of "phenolalcohols" by allowing formaldehyde to act on phenol—or phenol like substances—in the presence of alkaline or neutral condensing agents. The reaction taking place if, for instance, phenol be used, can be represented by the following equation:

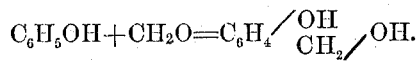

As is obvious from the equation above given, the molecule of formaldehyde used is simultaneously converted into the alcoholic group ($CH_2OH$) and combined with the benzene nucleus, hydroxy benzylalcohol being thus produced. According to my researches orthohydroxybenzylalcohol and para hydroxybenzylalcohol are together formed during the reaction illustrated by the equation above given.

I mean by the expression "phenol like substances" especially the following bodies: dihydroxybenzene, trihydroxybenzene or the like, alkylethers thereof such as anisol, phenetol, guajacol or the like, the nitro derivatives, sulphonic or carboxylic derivatives of these or analogous hydroxy or alkylhydroxy products. As condensing agents the following can be used: caustic soda, potassa, sodium carbonate, potassium carbonate, potassium cyanide or the like hydroxides or carbonates. The best result will be obtained, if the condensation hereinbefore defined is effected with the aid of dilute soda-lye or potash-lye.

In order to illustrate the method of carrying out the process hereinbefore defined, I give the following examples:

I. *Production of hydroxybenzylalcohols from phenol and formaldehyde.*—Thirty parts, by weight, of phenol are dissolved in one hundred and fifty parts, by weight, of a soda-lye containing ten per cent. of pure sodium hydroxide. The resulting solution is mixed with forty-five parts, by weight, of a solution in water of formaldehyde (containing thirty-three per cent. of pure $CH_2O$). The resulting liquid is allowed to stand during some days, after which the formation of the ortho hydroxybenzylalcohol and para hydroxybenzylalcohol is completed. After acidulating, the hydroxybenzylalcohols are separated from the watery solution by extraction with ether. On evaporating the solution in ether thus obtained, a mixture of the said two hydroxybenzylalcohols remains which are subsequently separated one from another in a suitable manner. For instance, on evaporating the solution of these alcohols in ether a semifluid mixture is obtained which is treated with steam, removing the small residue of formaldehyde and phenol which has not entered into reaction. The mixture being cooled down is filtered off from the small quantity of resinous bodies and the two hydroxybenzylalcohols are extracted from the mixture by means of ether, which solution after drying by means of sodium bicarbonate is evaporated to dryness. The alcohols which represent in this state a yellowish oil crystallize after some days' standing. This mass is treated with benzene at a temperature of about 50° centigrade by means of which operation the ortho oxybenzylalcohol can be removed from the para hydroxybenzylalcohol. The first crystallizes out of benzene in the form of splendid leaves, while the latter, which dissolves in benzene with greater difficulty remains in the form of an amorphous powder or small thin needles. The reaction taking place can be represented by the following two equations:

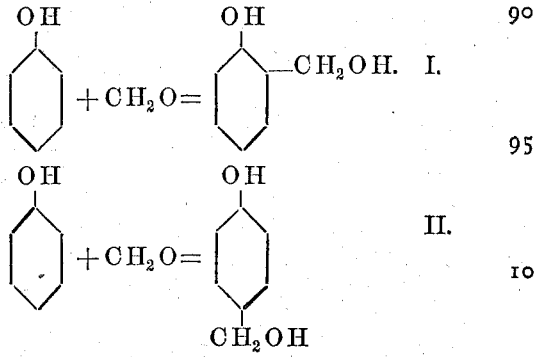

II. *Production of vanillin alcohol and iso-*

*vanillin alcohol from guajacol and formaldehyde.*—Seventeen parts, by weight, of a solution in water of formaldehyde (containing forty per cent. of $CH_2O$) are added to a solution prepared by dissolving 63 parts, by weight, of guajacol in sixty parts, by weight, of soda-lye (containing ten per cent. of pure sodium hydroxide). The resulting liquid is neutralized by means of acetic acid after some days, and the guajacol not altered is distilled over by means of steam. The alcohols thus obtained, viz: the vanillin alcohol and isovanillin alcohol, are subsequently separated from the remaining liquid in a suitable manner, for instance, by extraction with ether.

The process proceeds in a manner analogous to that described in the above examples, if the phenol or guajacol used therein are replaced by the corresponding quantity of other "phenol-like substances" such as are hereinbefore defined, and if instead of soda-lye other alkaline condensing agents such as potassa-lye and so on are used in the above examples.

Having now described my invention and in what manner the same is to be performed, what I claim as new, and desire to secure by Letters Patent, is—

The process for the production of "phenol-alcohols" by allowing formaldehyde to act on phenol or phenol-like substances in the presence of alkaline or neutral condensing agents such as soda lye, potassa lye, potassium cyanide and so on, in the manner hereinbefore described.

In testimony whereof I have signed my name in the presence of two subscribing witnesses.

OTTO MANASSE.

Witnesses:
PHILO KROEBER,
ROBERT DEMUTH.